Dec. 27, 1960 S. D. POOL ET AL 2,966,024
CORN PICKER DIVIDER WITH RUBBER WING EXTENSION
Filed Feb. 14, 1958 4 Sheets-Sheet 1

INVENTORS.
Stuart D. Pool
Benjamin M. Wyman
Paul O. Pippes
Atty

Dec. 27, 1960 S. D. POOL ET AL 2,966,024
CORN PICKER DIVIDER WITH RUBBER WING EXTENSION
Filed Feb. 14, 1958 4 Sheets-Sheet 2

INVENTORS.
Stuart D. Pool
Benjamin M. Wyman
Paul O. Pippel
Atty

Dec. 27, 1960 S. D. POOL ET AL 2,966,024
CORN PICKER DIVIDER WITH RUBBER WING EXTENSION
Filed Feb. 14, 1958 4 Sheets-Sheet 3
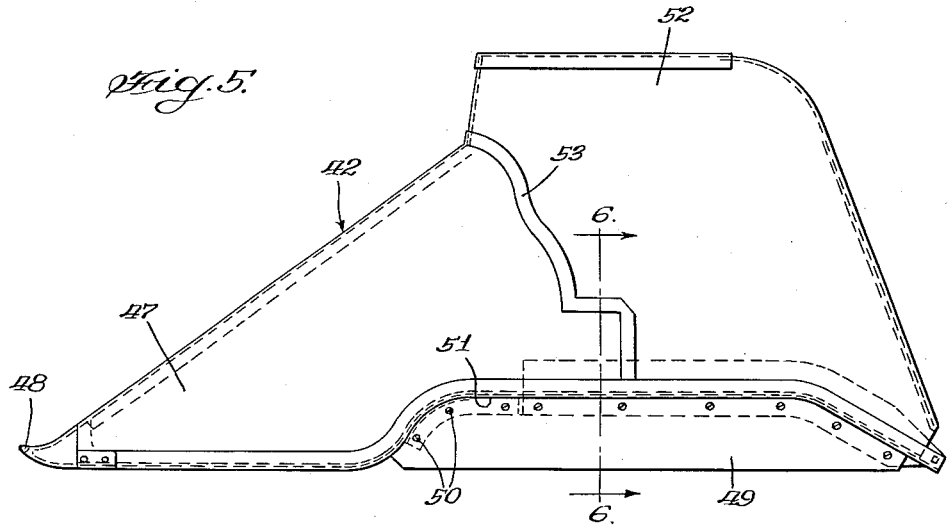
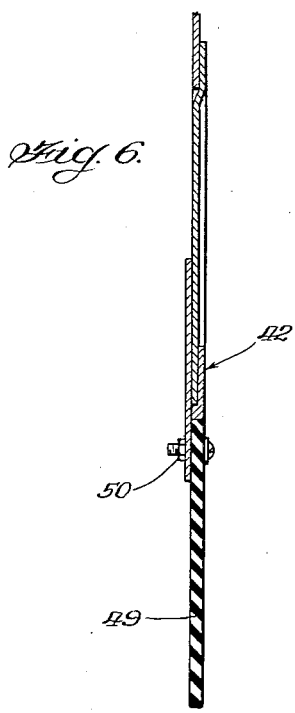
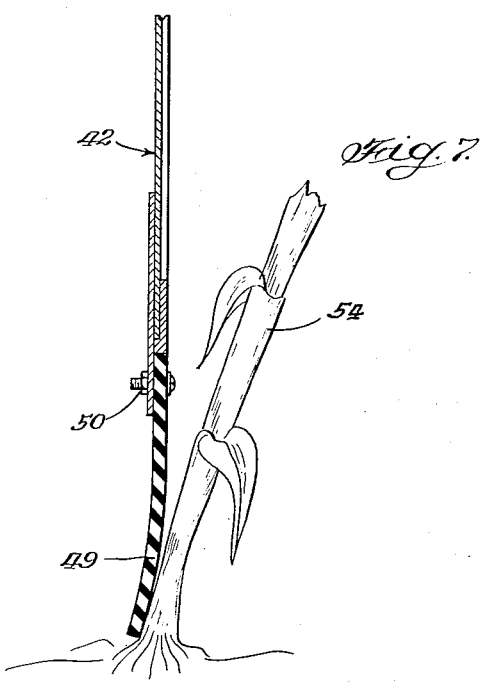
INVENTORS.
Stuart D. Pool
Benjamin M. Hyman
Paul O. Pippel
Atty Dec. 27, 1960  S. D. POOL ET AL  2,966,024
CORN PICKER DIVIDER WITH RUBBER WING EXTENSION
Filed Feb. 14, 1958  4 Sheets-Sheet 4
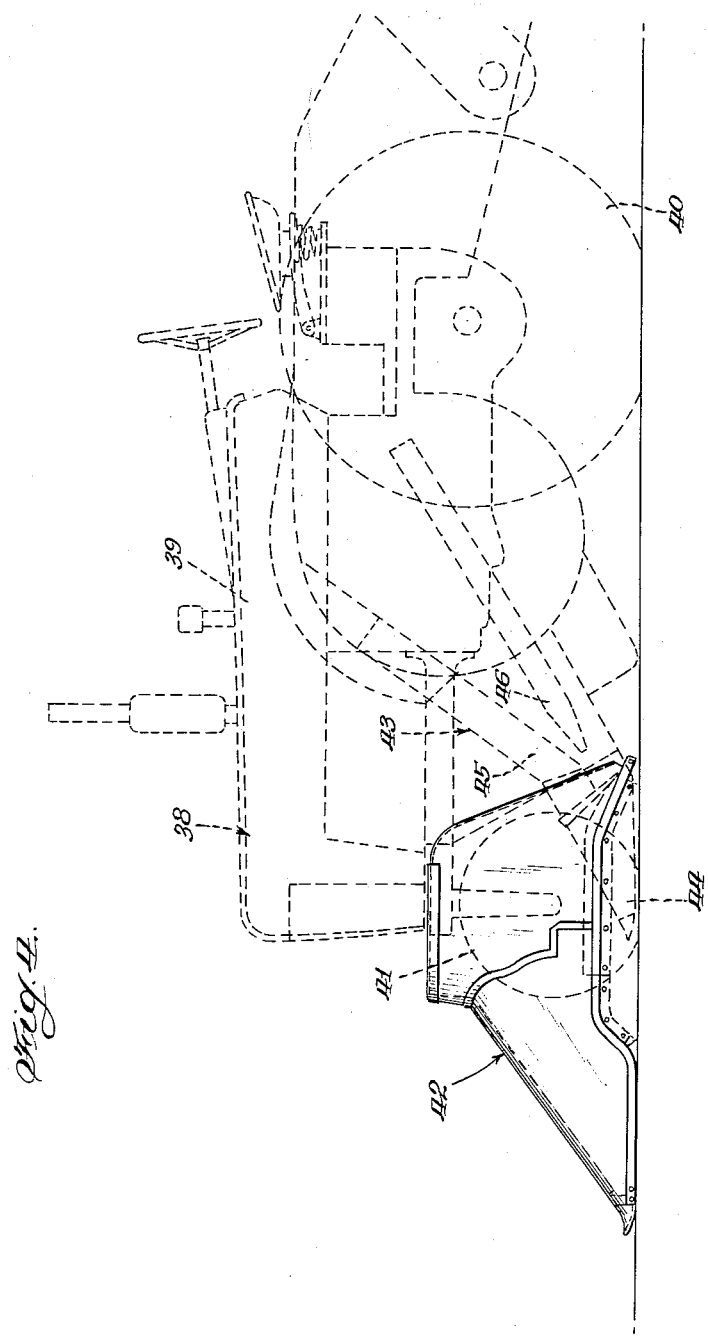
INVENTORS.
Stuart D. Pool
Benjamin M. Wyman
Paul O. Pippel
Atty.

United States Patent Office 2,966,024
Patented Dec. 27, 1960

2,966,024

CORN PICKER DIVIDER WITH RUBBER WING EXTENSION

Stuart D. Pool, Naperville, and Benjamin M. Hyman, East Moline, Ill., assignors to International Harvester Company, Chicago, Ill., a corporation of New Jersey Filed Feb. 14, 1958, Ser. No. 715,287

2 Claims. (Cl. 56—119)

This invention relates to a new and improved corn picker tractor divider with rubber wing extensions.

The tractor divider for a tractor-mounted corn picker is a shield means for the steerable wheels of the tractor which are positioned forwardly of the machine. The divider member is for the purpose of guiding stalks in the row being picked into the corn snapping rolls of the corn harvester. The tractor divider is of such a shape that stalks which have been blown or otherwise knocked down will be raised and guided into the snapping rolls of the harvester on either side thereof. In some dividers, as presently used, the rear portion thereof constitutes a hinged flap, so that when the divider is turned the rear extension thereof will not discharge stalks which are guided thereby to a position laterally outside of the corn snapping rolls, but rather the hinged flap is urged to a position where it snugly engages the inner gatherer sheet of the corn picker. It is apparent therefore that efforts have been made to insure the delivery of corn stalks into the corn snapping rolls without permitting the stalks to be lost prior to their gripping by the snapping rolls. Oftentimes the steel sheeted dividers have caused the stalks which they are supposed to pick up and guide into the corn snapping rolls to be broken off or, as previously stated, delivered far outside the snapping rolls and thereby deposit the corn on the ground unharvested.

It is, therefore, a principal object of the present invention to provide a corn picker tractor divider with rubber wing extensions to insure the proper guiding of stalks into the juncture between the cooperative snapping rolls without danger of breaking the stalks and thus losing control thereover.

Another important object of this invention is to provide a yieldable guide and a flexible transition between the steerable center divider of a corn picker and the inner gatherer sheet of the corn picker which is relatively fixed with respect to the corn snapping rolls.

Another important object of this invention is to provide a corn picker center divider with a vertical rubber insert at the bottom thereof to prevent shearing of stalks when the tractor goes off the row of corn being picked.

Other and further important objects and advantages will become apparent from the disclosures in the following specification and accompanying drawings.

In the drawings:

Figure 4 is a side elevational view of a tractor-mounted corn picker having a slightly different type of center divider shown thereon, but incorporating the rubber wing extensions of this invention (here again the tractor and picker have been shown in dashed lines with the center divider in full lines);

Figure 5 is an enlarged detailed side elevational view of the center divider as shown in the device of Figure 4;

Figure 6 is a detail sectional view, slightly enlarged, of the rubber wing extension of this invention and taken on the line 6—6 of Figure 5; and Figure 7 is a sectional view similar to that shown in Figure 6 and showing the contact of the rubber wing extension with a standing stalk of corn.

Figure 1:
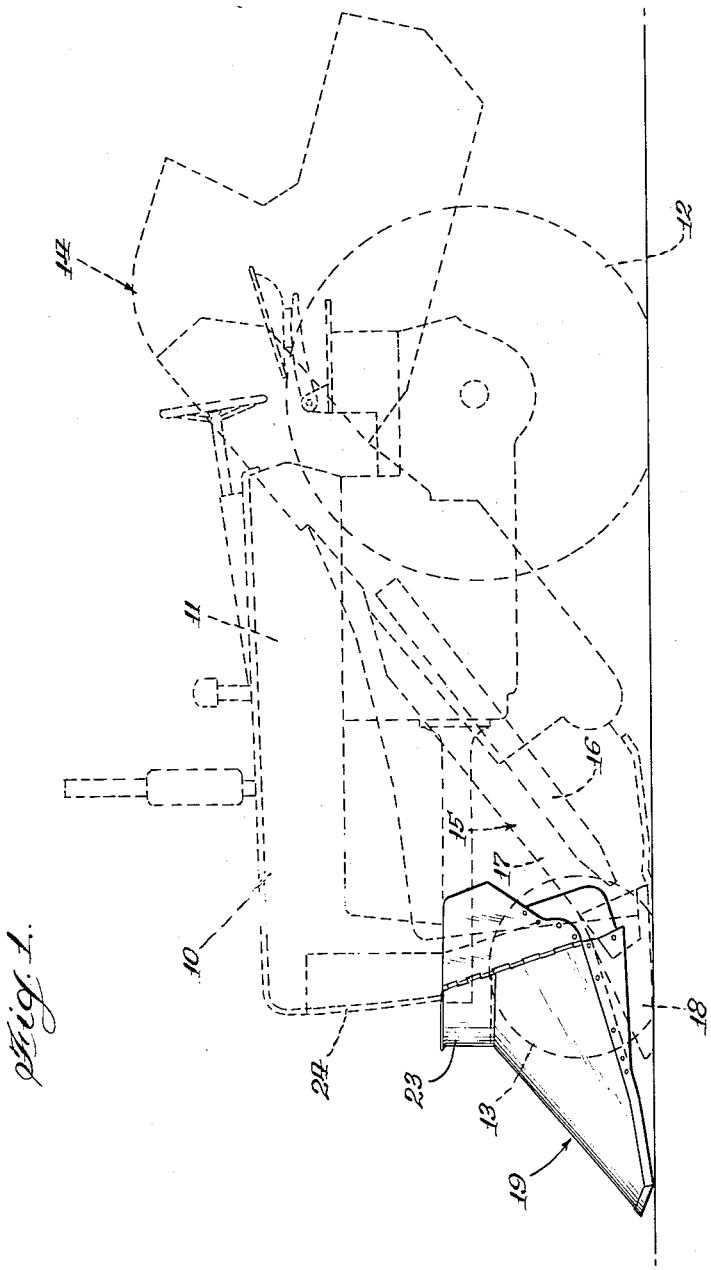
Figure 1 is a side elevational view of a tractor-mounted corn picker employing the center divider of this invention thereon (the tractor and corn picker have been shown in dashed lines except for the center divider, which has been shown in full lines, to clearly depict the invention and only show the remaining tractor and corn picker for environmental purposes)

As shown in the drawings, the reference numeral 10 indicates generally an agricultural tractor having a relatively long narrow body portion 11, widely spaced rear traction wheels 12, and forwardly disposed narrow dirigible wheels 13.

A two-row corn picker is shown mounted on the tractor 10 and is broadly identified by the numeral 14. The picker 14 comprises gathering or harvesting units 15 which flank the generally long narrow body 11 of the tractor 10. These gathering units 15 include cooperative corn snapping rolls 16 and are provided with inner gatherer sheets 17 against which the harvested corn stalks may be guided upwardly and rearwardly into the snapping rolls 16 to effect the removal of ears from the stalks of corn. The gatherer units 15 are defined at their forward end by an outer gathering point 18 and a center divider 19, which doubles as a wheel protecting device and a deflector means for guiding stalks into the gathering units on both sides of the tractor body 11.

Figure 2:
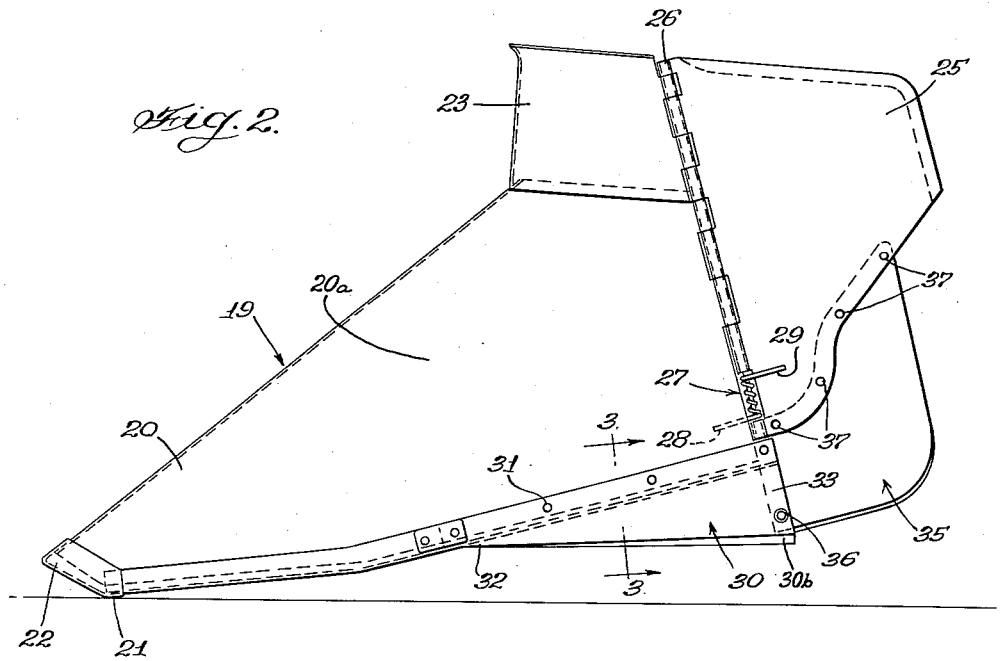
Figure 2 is an enlarged detailed side elevational view of the center divider of the tractor-mounted corn picker as shown in Figure 1.
Figure 3:
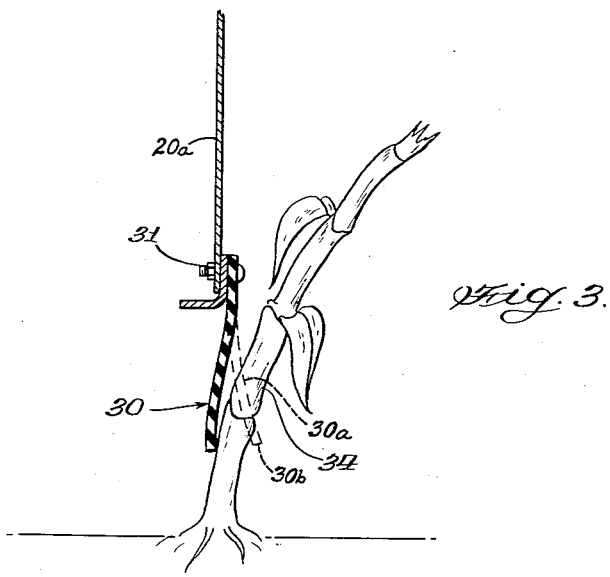
Figure 3 is a detailed sectional view, slightly enlarged, taken on the line 3—3 of Figure 2.

As best shown in Figure 2, the center divider 19 has a generally forwardly extending, elongated snout portion 20 which houses the dirigible wheels 13 of the tractor 10 and with the aid of runner-like members 21 at the bottom thereof facilitates sliding along the ground forwardly of the tractor-mounted corn picker to thereupon scoop up fallen corn stalks by a particular upturned nose 22 thereof. The upper end of the snout 20 is provided with an upstanding semi-circular wall 23 which is disposed substantially over the lower side of the front 24 of the engine or elongated body 11 of the tractor 10. The snout 20 has laterally spaced apart rearwardly extending sides or skirt portions 20a. The skirt portions 20a are substantially vertically arranged as shown in Figure 3. A rearward extension 25 is formed on both sides of the divider 19 and is adapted to slidably abut against the inner gatherer sheets 17 of the harvesting or gathering portions of the corn picker. The rearwardly extending extension 25 is hinged at 26 on a generally upright hinge, as shown in Figure 2. The hinge 26 departs from a vertical position in that it is inclined slightly forwardly at its upper end. A spring 27 having end arms 28 and 29 normally urges the flap or leaf extension 25 inwardly against the side or gatherer sheet 17. This insures that there will be a minimum of open space through which corn or stalks may escape during the harvesting and snapping of the ears. The general shape and construction of the center divider of this invention is shown in the patent to Van Buskirk 2,473,978 assigned to the same assignee of record as in the present case. The lower rearward edge of the snout portion 20 is provided with a rubber or flexible material insert 30. The rubber or flexible insert 30 is fastened by means of bolts or the like 31 to the lower edge portion of the skirt 20a and extends groundwardly at substantially the rear of the divider 19 and extending rearwardly to the location of the hinge 26. The flexible member 30 is substantially triangular in shape and tapers from a point 32 at its forward end to a substantial depth or height at 33 at its rearward end. The rubber-like extension or flexible material 30 is preferably made of tire carcass material, which is a rubber molded in and around a fabric making the wearing qualities of the flexible material very substantial and resistant to abrasion from engagement with numerous objects which may be on the ground and in the field in which the harvester of this invention is employed. The lower edge portion 30a of the rubber-like flexible insert 30 extends out of the plane of the rigid sheet metal skirt 20a as shown by the dash-line position thereof in Figure 3. The lower edge 30b of the flexible insert 30 is flared outwardly as clearly shown in Figure 2 of the drawing. This outward flaring causes the flexible portion of the divider to engage stalks and gently move them laterally for proper guiding into harvesting elements. As shown in Figure 3, the flexible material 30 with its outwardly flared lower edge 30b guides corn stalks, as shown at 34, into the gathering units and thence into the co-operative snapping rolls 16, whereupon the rolls cause the stalks to be forced downwardly therebetween, resulting in a snapping of the ears of corn growing on the stalk. It is therefore imperative that we retain control of the stalk until such time as the ear is snapped from the stalk and safely lodged within the corn harvester. The outwardly flaring flexible insert or downward extension of the center divider provides a gentle yet positive urging of the stalk 34 into the scope of travel of the corn gathering units on either side of the center divider 19. Another extension of rubber or flexible material at 35 is fastened by means of bolts or the like 36 to the rearward end 33 of the first gusset member 30 to effect a further continuation rearwardly of the flexible wall of the center divider. Further, the juncture between the first gusset member 30 and the second rearwardly extending leaf-like member 35 is on a line with the generally vertically disposed hinge 26. Thus the leaf extension 35, which is another flexible member, is disposed directly beneath the metal leaf extension 25 and forms a fixed part thereof. The member 35 is fastened to the lower edge of the hinged leaf member 25 by means of bolts or the like 37.

In the operation of the device of this invention, the corn harvester is propelled through a field of standing corn, whereupon the center divider 19 passes between adjacent rows of standing corn. The divider is employed for the purpose of picking up down stalks or irregularly positioned stalks and moving them either to one side or the other thereof for engagement by the corn gathering units on each side of the longitudinally extending body portion 11 of the tractor 10. In the device of Figures 1, 2 and 3 the center divider 19 turns with the steerable wheels 13 of the tractor 10. Thus in guiding the tractor with its mounted corn picker thereon through the field of standing corn, the hinged leaf members 25 extending rearwardly of the divider 19 are constantly in action and ride against the inner gatherer sheets as previously described. The spring 27 normally urges these rearward extending hinge members 25 into contact with the inner gatherer sheets regardless of which direction the tractor's steerable wheels are turned and thus insuring a closed surface from the front of the divider unit 19 to its discharge end at the gathering units. When the divider unit 19 is turned away from a straight line position with the remainder of the tractor there is an angular relationship of the divider proper and its rearwardly extending hinged member 25. This angular projection on one side of the implement at times could occasion the breaking of the stalks 34 prior to their actual gripping by the snapping rolls. This, of course, means a loss of corn and a resultant inefficiency attributed to the corn picker. With the rubber extensions 30 and 35 joined at the juncture between the body proper of the divider and the hinged flap 25 the downward edge of this juncture may yield inwardly, thus eliminating the sharp projection which would have been present had the divider and its rearward flap been constructed of a steel or other sheet metal all the way down to the bottom thereof. It is therefore very important to the successful operation of this machine to provide the adjoining rubber or flexible means 30 and 35 as shown. It should thus be apparent that although the lower edges of the center divider provide a positive directing and delivering of corn stalks into the corn gathering units they do not cause a breaking or a snapping of the stalks when there is an out-of-line position of the snout portion 20 of the center divider and its rearwardly hinged end flaps 25, or when the stalks being guided into the corn picker are slightly off row because of the flexible members 30 and 35.

The modification of the invention as shown in Figures 4 to 7, inclusive, provides the same yieldable characteristics at the necessary locations on the center divider thereof in the same manner as that shown for the device of Figures 1 to 3, inclusive. Here again, there is a tractor 38 having a generally longitudinally extending body or engine portion 39 supported at its rear on spaced apart large traction wheels 40 and at its front thereof on relatively small narrowly spaced steerable wheels 41. As in the case of Figure 1, the tractor 38 is shown in dashed lines to indicate merely environment for the center divider 42 on the front thereof and shielding the steerable wheels 41. A corn picker 43, also shown in dashed lines, is mounted on the tractor 38 and is arranged and constructed to gather standing corn by means of an outer gatherer point 44 and the center divider 42 for delivery into a gathering unit 45 which includes cooperative snapping rolls 46 therein. In the tractor-mounted corn picker of Figure 4 the center divider 42 is of the type which does not turn with the steerable wheels 41, but rather is sufficiently large in size to shield the wheels and permit turning of the wheels 41 therewithin without interfering with the divider shield.

As best shown in Figure 5, the center divider 42 includes a main snout portion 47 with a slightly turned-up runner type nose 48 which is adapted to ride on the ground and scoop up down stalks for sliding up the inclined surface of the snout 47 and thereby delivering them by a guiding into the gathering units of the corn picker 43. Here again, a gusset member 49 made of a flexible material such as rubber or tire carcass is bolted or otherwise fastened at 50 to the notched out portion 51 in the lower edge of the center divider 42. A wheel closing shroud or the like 52 is adapted to cover the steerable wheels 41 of the tractor and differing from the hinged flap member 25 in the device of Figure 2 the wheel shroud member 52 is formed integrally with the forward snout portion 47. The members 47 and 52 are fastened such as by welding along the seam 53 thereof. As shown in Figure 6, the yieldable rubber or like material 49, which is inserted like a gusset into the side wall of the divider 42, is generally vertically disposed until such time as it contacts a stalk or other object and, as best shown in Figure 7, the yieldable member 49 gently but positively guides the standing stalk 54 of corn or the like rearwardly into the corn gathering units of the picker of this invention. In both modifications of the invention the yieldable downward extensions perform the function of guiding stalks into the corn picker without damage to the stalks so that there is a minimum loss of corn harvested by the machines of this invention.

Various details of construction may be varied without departing from the principles disclosed herein and we therefore do not propose limiting the patent granted hereon otherwise than as necessitated by the appended claims.

What is claimed is:

1. A crop raising and guiding device for corn stalks and the like comprising a forwardly extending snout having a rearward substantially vertically arranged skirt portion, said skirt portion having a lower edge, a rubber-like extension on the lower portion of said skirt having a lower edge portion at least a part of which extends out of the plane of said skirt for engaging and guiding the corn stalks and the like without cutting or breaking the same.

2. A device as set forth in claim 1 in which there is included a rearwardly extending flap hingedly attached on a substantially vertical axis to the rearward edge of said skirt with the rubber-like extension, said hinged flap having a rubber-like extension attached to the lower edge thereof and extending groundwardly, and said rubber-like extension on the hinged flap attached to the rubber-like extension on the snout to thereby provide a continuous flexible guiding surface for crops from a position on the snout through to a position on the hinged flap.

References Cited in the file of this patent
UNITED STATES PATENTS

| | | |
|---|---|---|
| 2,284,909 | Kuhlman | June 2, 1942 |
| 2,473,978 | Van Buskirk | June 21, 1949 |
| 2,645,503 | Johnson | July 14, 1953 |
| 2,663,983 | Fergason | Dec. 29, 1953 |
| 2,685,149 | Hvistendahl | Aug. 3, 1954 |
| 2,737,767 | Korsmo et al. | Mar. 13, 1956 |